United States Patent

Hass

(10) Patent No.: US 9,569,324 B2
(45) Date of Patent: Feb. 14, 2017

(54) SYSTEM AND METHOD FOR REDUCING BOOT TIME OF A WORKLOAD CONFIGURATION ON A TARGET SERVER

(71) Applicant: Dell Products, LP, Round Rock, TX (US)

(72) Inventor: Jon R. Hass, Austin, TX (US)

(73) Assignee: DELL PRODUCTS, LP, Round Rock, TX (US)

(*) Notice: Subject to any disclaimer, the term of this patent is extended or adjusted under 35 U.S.C. 154(b) by 149 days.

(21) Appl. No.: 14/548,917

(22) Filed: Nov. 20, 2014

(65) Prior Publication Data

US 2016/0147626 A1   May 26, 2016

(51) Int. Cl.
*G06F 11/00*   (2006.01)
*G06F 11/22*   (2006.01)
*G06F 9/44*    (2006.01)

(52) U.S. Cl.
CPC ......... *G06F 11/2284* (2013.01); *G06F 9/4401* (2013.01)

(58) Field of Classification Search
CPC .................. G06F 11/2284; G06F 9/44505
See application file for complete search history.

(56) References Cited

U.S. PATENT DOCUMENTS

| 2011/0093690 | A1* | 4/2011 | Vyssotski | G06F 9/4406 713/2 |
| 2011/0119678 | A1 | 5/2011 | Filali-adib et al. | |
| 2014/0047095 | A1 | 2/2014 | Breternitz et al. | |
| 2016/0147627 | A1* | 5/2016 | Hass | G06F 9/44505 714/36 |

* cited by examiner

*Primary Examiner* — Charles Ehne
(74) *Attorney, Agent, or Firm* — Larson Newman, LLP

(57) ABSTRACT

An information handling system includes a communication device and a service processor. The communication device includes first terminal, and a second terminal to communicate with a network storage array. The service processor includes a first terminal to receive configuration settings for the communication device, and a second terminal to provide the configuration settings to the communication device. The service processor configures the communication device based on the configuration settings during a first boot sequence of the information handling system. A power-on self test of a basic input/output system of the information handling system is stalled while the service processor configures the communication device based on the configuration settings, and the information handling system is booted from a workload on a storage array identified in the configuration settings without using a second boot sequence of the information handling system.

17 Claims, 3 Drawing Sheets

SYSTEM AND METHOD FOR REDUCING BOOT TIME OF A WORKLOAD CONFIGURATION ON A TARGET SERVER

FIELD OF THE DISCLOSURE

The present disclosure generally relates to system and method for reducing boot time of a workload configuration on a target server.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

Information handling systems in a data center can access bootable workload images on Storage Area Networks (SANs). A communication device within the information handling system can be configured to access and boot from a particular storage array, or SAN logical unit number (LUN), within a SAN.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
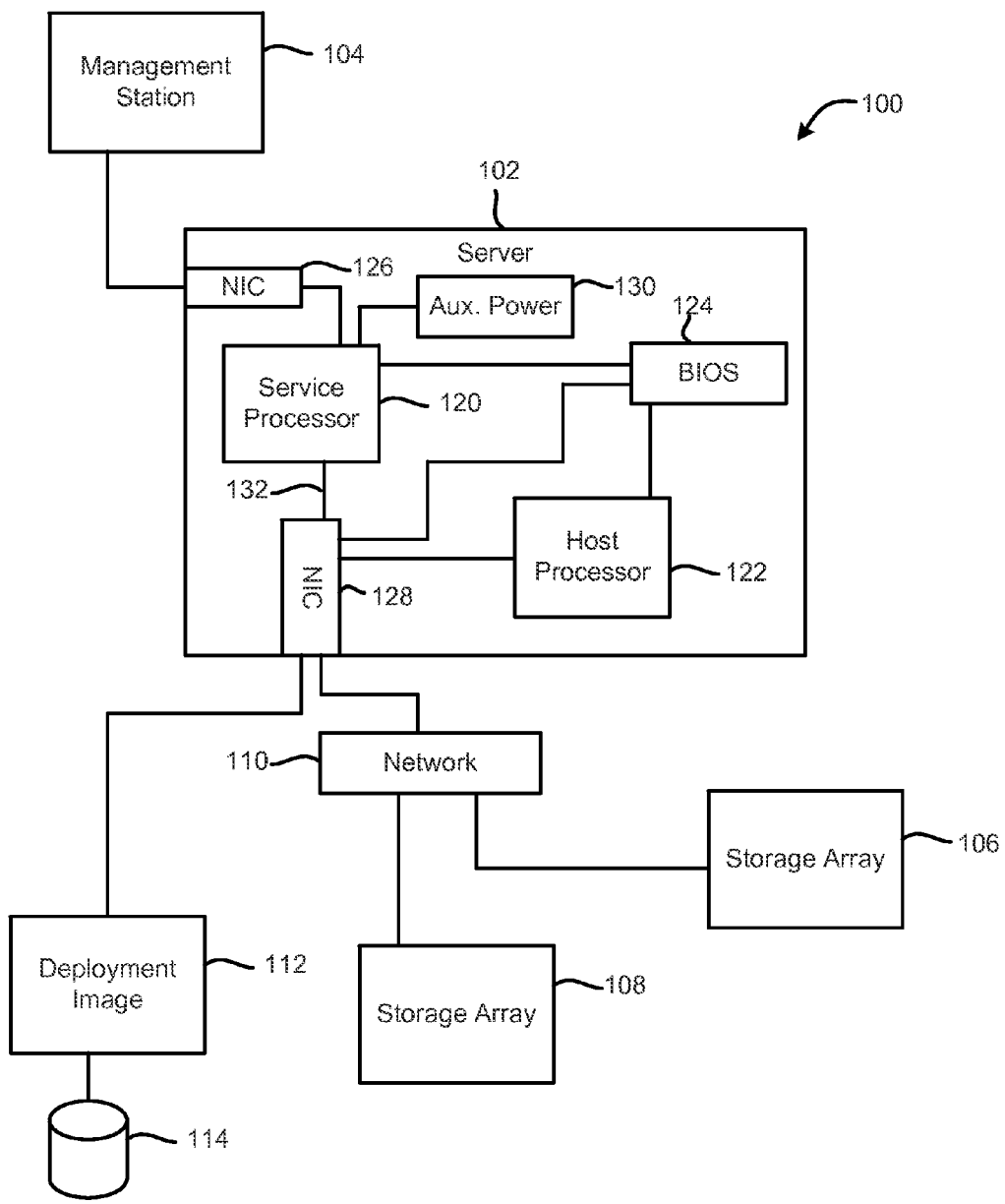
FIG. 1 is a block diagram of an information handling system.

FIG. 1 shows an information handling system 100. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

The information handling system 100 includes a server 102, a management station 104, storage arrays 106 and 108 connected to the server via a network 110, and a deployment image 112 including a memory 114. The server 102 includes a service processor 120, a host processor 122, a basic input/output system (BIOS) 124, communication devices, such as network interface cards (NICs) 126 and 128, and an auxiliary power device 130. The service processor 120 includes multiple input/output terminals to communicate with the BIOS 124, the NICs 126 and 128, and to receive power from the auxiliary power device 130. The host processor 122 includes multiple input/output terminals to communicate with the BIOS 124 and with the NIC 128. The BIOS 124 and the NIC 128 also include input/output terminals to communicate with each other.

In an embodiment, the NIC 126 can be a dedicated NIC for the service processor 120 to communicate with the management station 104. In another embodiment, the service processor 120 can communicate with the management station 104 via a communication device, such as the NIC 128, that is utilized by multiple components within the server 102. In the embodiment illustrated in FIG. 1, the NIC 128 can be utilized by the host processor 122 to communicate with the deployment image 112 without accessing the network 110. In another embodiment, the deployment image 112 can be located within the network 110, such that communications between the server 102 and the deployment image go through network 110.

In an embodiment, an individual can utilize the management station 104 to manage the server 102, such as controlling that the server boots a specific workload stored within a storage area network (SAN) node having a specific logical unit number (LUN), such storage array 106 or 108. The management station 104 can manage booting workloads on particular servers, such as server 102, according to workload hardware requirements, service level agreements (SLAs), and other criteria. The management station 104 may move workloads from one server to another and start a workload of storage array 108 on server 102 that had previously been booting from a different SAN LUN, such as storage array 106.

The management station 104 can cause the server 102 to power-on, restart, or the like, and as a result a power-on self test (POST) of the BIOS 124 can begin. During the POST, instructions in firmware of the BIOS 124 can be executed to cause the server 102 to boot or otherwise execute on the deployment image 112. In response to the deployment image 112 being booted, the deployment image can run software, such as scripts or an agent stored in the memory device 114. This software can cause the deployment image 112 to determine a configuration that is desired for the server 102. The deployment image 112 can then provide the NIC 128 with the configuration information or settings to configure the NIC with the proper storage target information, such as target information for the storage array 108. Once the NIC 128 is configured the server 102 can be restarted and a new boot sequence can be initialized, including another POST of the BIOS 124. During this POST, the NIC 128 can have the proper configuration information or settings to communicate with the storage array 108 via the network 110, such that a workload of the storage array designated in the configuration settings can be booted within server 102, and the host processor 122 can run the workload in the storage array. Thus, in this situation, the server 102 performs two separate POSTs of the BIOS 124 before the desired workload is booted from one of the SAN LUNs, such as storage array 108.

In an embodiment, the management station 104 can directly provide configuration settings for NIC 128 to the service processor 120 to change the workload executed by the host processor 122. In this embodiment, the management station 104 can provide the configuration settings to the service processor 120 both while the host processor 122 is executing another workload, and while the server 102 is powered down. The auxiliary power device 130 is utilized to provide power to the service processor 120 while the remaining portions of the server 102 are powered down. Thus, the service processor 120 can communicate with the management station 104 and get updated configuration settings while the server 102 is powered down.

In an embodiment, the management station 104 can provide the configuration information to the service processor 120 via NIC 126 to repurpose the server 102 to boot off another workload image. When the management station 104 provides the new configuration information, the NIC 128 and BIOS 124 can be reconfigured based on the configuration information during the next system restart. In an embodiment, the configuration information can also indicate, to the service processor 120, that the new configuration is to be applied at a predetermined time in the future, such as a particular time and day. In this embodiment, if the configuration is to be applied at a future time, a restart of the server 102 prior to the indicated time would not cause the reconfiguration of the NIC 128 and the BIOS 124. Instead, the host processor 122 would continue executing the workload already being executed by the host processor.

As stated above, the service processor 120 can receive the configuration information from the management station 104 while the host processor 122 is executing a different workload or while the host processor is powered down. The next time the host processor 122 is restarted or otherwise powered on, a boot sequence for the server 102 can be started. A POST the BIOS 124 can then begin, during which, the components within the server 102 are configured. For example, memory controller is configured, power supplies of the server 102 are checked, power buses are brought up to operating power levels, the NIC 128 is powered up, and the like. At this point in time, even though the NIC 128 powered up, the NIC is not initialized by the BIOS 124, such as through a peripheral component interconnect (PCI) Int signal from the BIOS. However, the NIC 128 can perform its own internal initialization steps to verify that the components within the NIC are ready for operation. The BIOS 124 can continue to preform the steps of the POST, and then send an intelligent platform management interface (IPMI) handshake signal to the service processor 120 in response to the BIOS having verified that the components within the server 102 are ready to operate. Upon the BIOS 124 sending the IPMI handshake signal to the server processor 120, the BIOS can enter into a polling loop querying the service processor to determine whether the service processor has finished the configuration of the NIC 128. In effect, this polling loop of the BIOS 124 causes the POST to be stalled until a handshake response is received from the service processor 120 initiated that the service processor has completed the configuration of the NIC 128.

During the internal initialization of the NIC 128 and while the POST of the BIOS 124 is stalled in the polling loop, the service processor 120 can communicate with the NIC via a sideband interface 132, such as an I2C bus, an reduced media independent interface (RMII) communication bus, a peripheral component interconnect express (PCIe) vendor defined message (VDM) communication bus, or the like, or via the BIOS acting as a proxy for the service processor. The service processor 120 can provide the NIC 128 with desired configurations, such as booting a particular workload stored on storage array 108, that are based on the configuration information received from the management station 104. In an embodiment, prior to the service processor 120 providing the configurations to the NIC 128, the service processor can check the current configuration of the NIC to verify that the NIC does not have any current configurations or that the current configurations are different than the desired configurations received from the management station 104.

In an embodiment, the service processor 120 can load the configuration information into the NIC 128 via the sideband interface 132. However, if server 102 does not include the sideband interface 132 or the service processor 120 cannot communicate with the NIC 128 via the sideband interface for some reason or another, the service processor can utilize the BIOS 124 as a proxy to load the configuration information within the NIC. In this situation, the service processor 120 can load the configuration information along with instructions to push the configuration information to the NIC 128 within the stack of instructions to be executed by the BIOS 124 during the POST. The configuration information and associated instruction or instruction can be loaded within the stack before the PCI Int signal is sent to the NIC 128, such that the NIC is already configured to communicate with the desired storage array 106 or 108 before the NIC is initialized by the BIOS. Thus, in both of these situations, the NIC 128 can be configured to communication with a particular storage array before the PCI Int signal is sent to the NIC.

When the service processor 120 has completed updating the configuration of the NIC 128 via the sideband interface 132, the service processor can send a continue boot signal to the BIOS 124. The continue boot signal can cause the POST of the BIOS 124 to continue executing instructions from the location in the firmware that it was previously stalled, the BIOS can then provide the PCI Int signal to the NIC 128, and the remaining instructions of the POST can be completed. In response to the PCI Int signal, the NIC 128 can utilize the new configuration information provided by the service processor 120 to communicate with, attach, and present the workload image of the SAN LUN, storage array 106 or 018, to the host processor 122 and the BIOS 124 as a locally attached storage device.

For example, an initiator configured in the NIC 128 can communicate with the storage array 108 via network 110 and can then cause the storage array 108 to appear to the BIOS 124 as a local storage device for the server 102. After the POST is completed the BIOS 124 can connect to an operating system on the storage array 108 and can boot the desired workload so that the host processor 122 can then begin to execute that workload. Thus, the management station 104 can update the workload to be executed by the host processor 122 via the service processor while the host processor is executing a different workload or while the host processor is powered down, such that the new workload can be booted and execution of the new workload can begin during a single POST of the BIOS 124.

Figure 2:
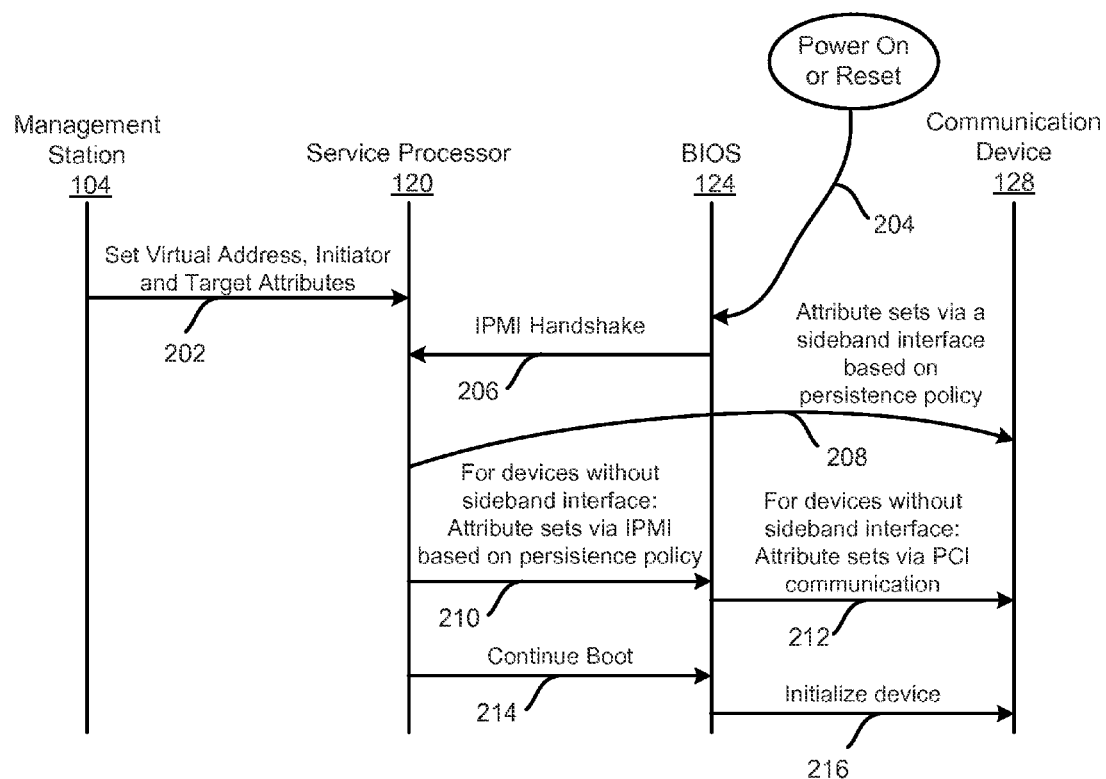
FIG. 2 is a diagram illustrating communication between different components of the information handling system.

FIG. 2 shows communications between the management station 104, the service processor 120, the BIOS 124, and the NIC 128. A first communication 202 is provided from the management station 104 and the service processor 120. In an embodiment, this communication can include configuration information to repurpose the communication device 128. The configuration information can include a virtual address, an initiator, and target attributes as shown for communication 202. The server can then be powered on or a reset signal 204 can then be provided to the BIOS 124. As stated above, a POST of the BIOS 124 can then be performed, during which, an IPMI handshake signal 206 is from the BIOS 124 to the service processor 120. The IPMI handshake signal 206 causes the service processor 120 to load the configuration information within the communication device 128.

If communication between the service processor 120 and the communication device 128 is possible over a sideband interface, such as sideband interface 132 of FIG. 1, the attributes of the communication device 128 are set by the service processor 120 pushing the configuration information to the communication device via a signal 208 over the sideband interface based on persistence policies of the service processor and the communication device. In an embodiment, the persistence policies can control how information is updated, retained, or other controlled for the service processor 120 and the communication device 128.

If communication is not possible over the sideband interface, the attributes are set in the communication device 128 in response to the BIOS 124 acting as a proxy for the service processor 120. In this situation, the service processor 120 pushes the attributes for the communication device 128 into the instruction pipeline of the BIOS 124 based on persistence policies via a IPMI communication signal 210. The BIOS 124 can then execute these instructions and provide the configuration information, which is used to set the attributes of the communication device 128, to the communication device via a PCI communication signal 212. After the attributes of the communication device 128 are updated, either by the sideband interface or the BIOS 124 acting as proxy, the service processor can provide a continue boot signal 214 to the BIOS 124. The continue boot signal 214 can cause the POST of the BIOS 124 to be completed including a initialization signal 216, such as a PCI Int signal, being sent to communication device 128 to initialize the communication device.

Figure 3:
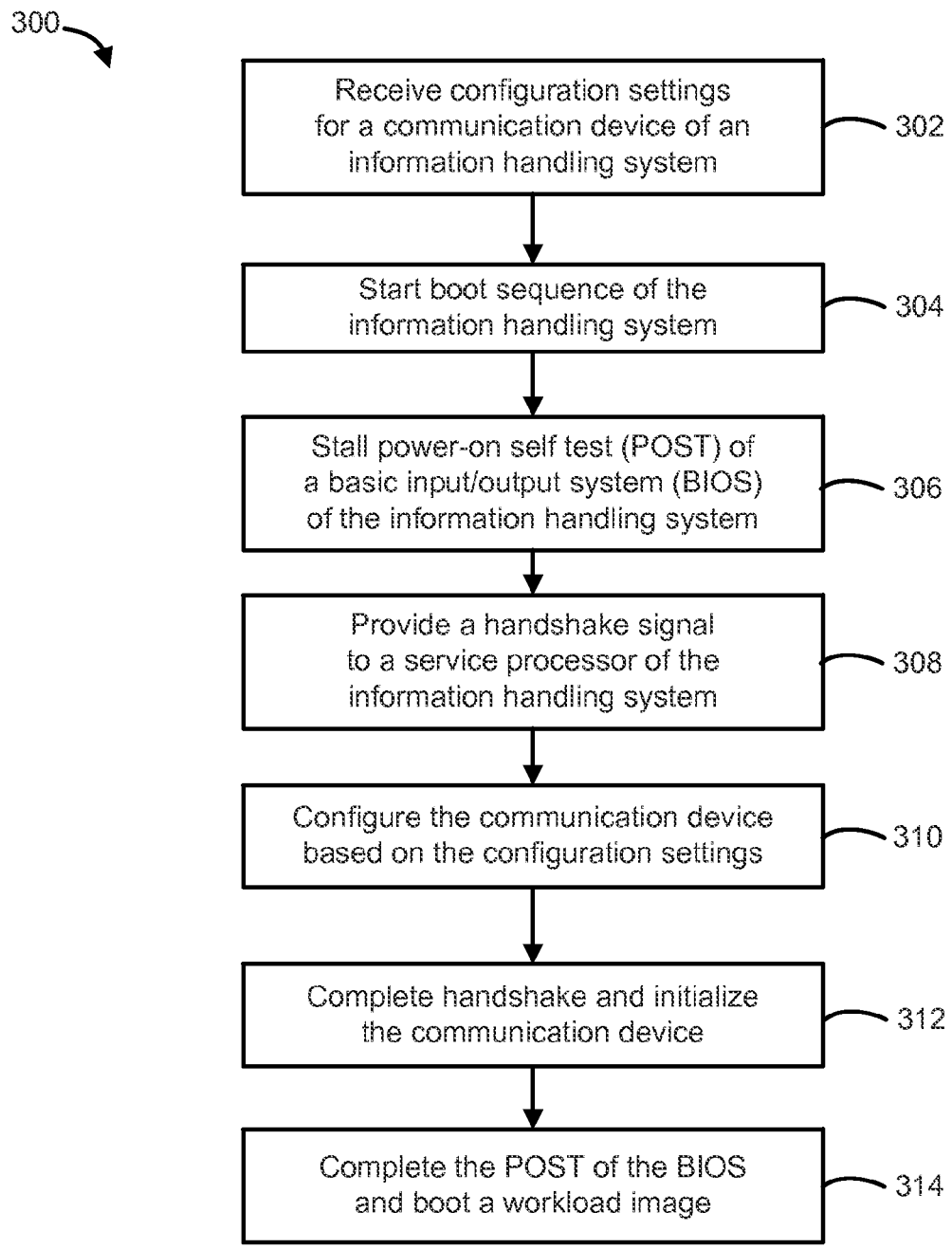
FIG. 3 is a flow diagram of a method for performing a boot to a new workload during a single power-on self test in the information handling system.

FIG. 3 shows a flow diagram of a method 300 for performing a boot to a new workload during a single power-on self test in the information handling system. At block 302, configuration settings for a communication device of an information handling system are received at a service processor. In an embodiment, the communication device can be a NIC, a converged network adapter (CNA), an FC-HBA, or the like. In an embodiment, the configuration information includes a virtual address, an initiator, and target configuration settings. The flow proceeds to block 304, and a boot sequence for the information handling system is started. At block 306, a power-on self test of a basic input/output system of the information handling system is stalled. A handshake signal is provided to the service processor at block 308. In an embodiment, the handshake signal can be an IPMI handshake to cause the service processor to verify that the communication device is configured based on the configuration information received from the management station, to configure the communication device, or the like.

The communication device is configured, by the service processor, based on the configuration settings during the boot sequence at block 310. In an embodiment, the service processor configures the communication device by providing the configuration information or settings to the communication device via a sideband interface between the service processor and the communication device. In an embodiment, the service processor configures the communication device by providing the configuration information through the BIOS with the BIOS acting as a proxy for the service processor as described above. At block 312, the handshake is completed and the communications device is initialized. In an embodiment, the initialization of the communication device can cause the communication device to access and attach the SAN based workload image as a locally bootable device. The power-on self test of the basic input/output system is completed and the workload image is booted at block 314.

Modifications, additions, or omissions may be made to the information handling system 100 described herein without departing from the scope of the disclosure. For example, information handling system 100 may include any number of components such as the server 102, the management station 104, and the storage arrays 106 and 108. Additionally, the server 102 can include multiple components including the service processor 120, the host processor 122, the BIOS 124, the NICs 126 and 128, and the auxiliary power device 130. In different embodiments, these components may be integrated or separated. Moreover, the operations may be performed by more, fewer, or other components. Additionally, the operations may be performed using any suitable logic comprising software, hardware, and/or other logic.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
a communication device including a first terminal, and a second terminal to communicate with a network storage array; and
a service processor including a first terminal to receive configuration settings for the communication device, wherein the configuration settings are received while a host processor of the information handling system is running a different workload than the workload to be enabled by the configuration settings, and a second terminal to provide the configuration settings to the communication device, the service processor to configure the communication device based on the configuration settings during a first boot sequence of the information handling system, wherein a power-on self test of a basic input/output system of the information handling system is stalled while the service processor configures the communication device based on the configuration settings, and the information handling system is booted from a workload on a storage array identified in the configuration settings during the power-on self test of the basic input/output system.

2. The information handling system of claim 1 further comprising:
the basic input/output system having a first terminal to output a handshake signal to second terminal of the service processor during the power-on self test, wherein the handshake signal notifies the service processor to configure the communication device if the service processor has configuration settings that are different than current configuration settings within the communication device.

3. The information handling system of claim 1 wherein the service processor configures the communication device via the basic input/output system being a proxy for the communication device.

4. The information handling system of claim 1 further comprising:
an auxiliary power source to provide power to the service processor while remaining portion of the information handling system are off.

5. The information handling system of claim 1 wherein the service processor configures the communication device via a sideband interface.

6. The information handling system of claim 1 wherein the configuration settings are received while a host processor of the information handling system is powered off.

7. A method comprising:
receiving, at a service processor of an information handling system, configuration settings for a communication device, wherein the configuration settings are received while a host processor of the information handling system is running a different workload than the workload to be enabled by the configuration settings;
starting a boot sequence for the information handling system;
configuring, by the service processor, the communication device based on the configuration settings during the boot sequence;
stalling a power-on self test of a basic input/output system while the service processor configures the communication device;
booting a workload on a network storage array identified in the configuration settings; and
completing the power-on self test of the basic input/output system in response to the configuring of the communication device being completed by the service processor and the booting of the workload on the network storage array being completed.

8. The method of claim 7 wherein configuring the communication device comprises:
transmitting the configuration settings from the service processor to the communication device via a sideband interface.

9. The method of claim 7 wherein configuring the communication device comprises:
transmitting the configuration settings from the service processor to the communication device via the basic input/output system being a proxy for the service processor.

10. The method of claim 7 further comprising:
transmitting a handshake signal to the service processor after the communication device is powered on during the power-on self test and prior to an initialization signal being sent from the basic input/output system to the communication device.

11. The method of claim 7 wherein the configuration settings include a virtual address, an initiator, and target configuration settings for the communication device to communicate with the network storage array.

12. The method of claim 7 wherein the communication device is a network interface card.

13. The method of claim 7 wherein the configuration settings is received while a host processor of the information handling system is powered off.

14. The method of claim 7 further comprising:
providing, by an auxiliary power source, power to the service processor while remaining portions of the information handling system are powered off.

15. A method comprising:
receiving, at a service processor of an information handling system, first configuration settings for a communication device while a host processor of the information handling system is powered off or the host processor is executing a second workload, wherein the first configuration settings are different than second configuration settings currently in the communication device;
booting the information handling system from a first workload stored on a first storage array in a network in response to a single power-on self test of a basic input/output system of the information handling system;
configuring the communication device based on the first configuration settings via a sideband interface between the service processor and the communication device.

16. The method of claim 15 further comprising:
configuring the communication device based on the first configuration settings via the basic input/output system being a proxy for the service processor.

17. The method of claim 15 wherein the single power-on self test of the basic input/output system is a power-on self test is performed during a first boot sequence executed after the first configuration settings are received at the service processor.

\* \* \* \* \*